US012024237B2

(12) United States Patent
Gono et al.

(10) Patent No.: US 12,024,237 B2
(45) Date of Patent: Jul. 2, 2024

(54) WORK VEHICLE

(71) Applicant: KUBOTA CORPORATION, Osaka (JP)

(72) Inventors: Tsuyoshi Gono, Osaka (JP); Susumu Takeoka, Osaka (JP); Kazutaka Fujimoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 303 days.

(21) Appl. No.: 17/537,794

(22) Filed: Nov. 30, 2021

(65) Prior Publication Data

US 2022/0281537 A1 Sep. 8, 2022

(30) Foreign Application Priority Data

Mar. 3, 2021 (JP) ................................. 2021-033399
Mar. 3, 2021 (JP) ................................. 2021-033400

(51) Int. Cl.
*B62D 37/04* (2006.01)
*B62D 7/15* (2006.01)
*B62D 49/08* (2006.01)

(52) U.S. Cl.
CPC ........... *B62D 37/04* (2013.01); *B62D 7/1572* (2013.01); *B62D 7/159* (2013.01); *B62D 49/085* (2013.01)

(58) Field of Classification Search
CPC .. B64C 39/024; G01N 29/2475; G01N 29/28; G01N 2291/106; G01N 29/04; G01N 29/225; G01N 29/265; B64U 2101/00
See application file for complete search history.

(56) References Cited

U.S. PATENT DOCUMENTS 10,167,027 B2 * 1/2019 Perron ............... B62D 49/0621

FOREIGN PATENT DOCUMENTS

| DE | 102006023603 A1 | 11/2007 |
| EP | 1 995 157 A1 | 11/2008 |
| JP | S53-142719 A | 12/1978 |
| JP | S54-022612 A | 2/1979 |
| JP | 2013-163482 A | 8/2013 |
| JP | 2014-205368 A | 10/2014 |
| JP | 2021-166488 A | 10/2021 |

OTHER PUBLICATIONS

Extended European Search Report issued in European Patent Application No. 21212112.3 dated May 4, 2022.
Japanese Office Action in counterpart Japanese Application No. 2021-033399, dated Jan. 9, 2024 (and English translation thereof).
Japanese Office Action in counterpart Japanese Application No. 2021-033400, dated Jan. 9, 2024 (and English translation thereof).

* cited by examiner

*Primary Examiner* — Rodney A Butler
(74) *Attorney, Agent, or Firm* — Greenblum & Bernstein, P.L.C.

(57) ABSTRACT

A work vehicle includes: a body frame; a front weight at a front end portion of the body frame; a support mechanism supporting the front weight in such a manner that the front weight is movable in a front-back direction relative to the body frame; and a drive actuator configured to move the front weight in the front-back direction relative to the body frame between (i) a back position, at which the front weight is close to the body frame, and (ii) a front position, at which the front weight is far from the body frame.

4 Claims, 7 Drawing Sheets

WORK VEHICLE

CROSS REFERENCE TO RELATED APPLICATIONS

This application is based on and claims priority under 35 U.S.C. Section 119 to Japanese Patent Application No. 2021-033399 filed on Mar. 3, 2021, and Japanese Patent Application No. 2021-033400 filed on Mar. 3, 2021, the entire contents of both of which are incorporated herein by reference.

TECHNICAL FIELD

The present invention relates to a work vehicle including a front weight at a front portion of the body.

BACKGROUND ART

JP 2014-205368 A, for example, discloses a conventional work vehicle including (i) a weight-supporting bracket fixed to a front end portion of the body frame and (ii) a front weight supported by the bracket.

A work vehicle of this type is provided with a work device connected to a back portion of the body to perform work on the ground. A work vehicle configured as such tends to have a body with its center of gravity positioned backward, and may thus be provided with a front weight at a front end portion of the body. This allows the work vehicle to have a weight well-balanced in the front-back direction during work travel, allowing the front wheels to reliably drive the body and increasing the traction of the body.

To further increase the above traction of the body, it is preferable for the front weight to lay a larger weight forward. Such a larger weight may be laid forward by, for example, using a large-sized front weight or placing a front weight such that its center of gravity is forward relative to the body.

The above configurations, however, cause a front weight to protrude forward by a large amount and the body to have a large front-back dimension. When, for instance, the work vehicle makes a turn before reaching a ridge in an agricultural field, the front weight protruding forward is more likely to come into contact with the ridge. The work vehicle thus needs to make an early turn, which may decrease the work efficiency accordingly. Further, such a work vehicle, which has a large front-back dimension, may not be loaded on a truck if the truck is small-sized.

[Object 1]
The above circumstances have led to a demand for a work vehicle that is capable of increasing the traction of the body during work travel and that does not cause inconvenience during, for example, turn travel or conveyance.

[Object 2]
The above circumstances have also led to a demand for a work vehicle that is capable of increasing the traction of the body during work travel and that does not require a complicated operation for turn travel to prevent a decrease in the work efficiency.

SUMMARY OF INVENTION

[Solution 1]
The description below deals with a solution to Object 1.
The present invention characteristically includes:
a body frame;
a front weight at a front end portion of the body frame;
a support mechanism supporting the front weight in such a manner that the front weight is movable in a front-back direction relative to the body frame; and
a drive actuator configured to move the front weight in the front-back direction relative to the body frame between (i) a back position, at which the front weight is close to the body frame, and (ii) a front position, at which the front weight is far from the body frame.

The above characteristic configuration allows the driver to operate the drive actuator for the front weight to be at the front position when the driver intends to cause the work vehicle to travel while performing work on the ground in an agricultural field. This eliminates the need to include a large-sized front weight, and allows the front weight to have a center of gravity at a position forward relative to the body. This in turn increases the traction of the body.

The above configuration also allows the driver to operate the drive actuator for the front weight to be at the back position when, for instance, the driver intends to cause the work vehicle to perform turn travel near a ridge or when the work vehicle is to be loaded on a truck for conveyance. This reduces the amount by which the front weight protrudes forward, and thereby reduces the front-back dimension of the body. This in turn reduces the risk of the front weight coming into contact with a ridge, and thereby improves the work efficiency. Further, the reduced front-back dimension of the body eliminates inconveniences such as the work vehicle being unloadable on a truck for conveyance.

The above configuration therefore allows production of a work vehicle that is capable of increasing the traction of the body during work travel and that does not cause inconvenience during, for example, turn travel or conveyance.

The present invention may preferably be further arranged such that
the support mechanism includes:
at least one support rod extending in the front-back direction and movable in the front-back direction integrally with the front weight while supporting the front weight, and
at least one slide support disposed on the body frame and supporting the at least one support rod in such a manner that the at least one support rod is slidable in the front-back direction.

The above characteristic configuration allows the support rod to be slid in the front-back direction while supporting the front weight. This in turn allows the front weight to be moved in the front-back direction. Further, the support rod is supported by the body frame by means of the slide support. This allows the support rod to move the front weight smoothly while firmly supporting the heavy front weight.

The present invention may preferably be further arranged such that
the at least one support rod includes a first support rod leftward of the body frame and a second support rod rightward of the body frame, and
the at least one slide support includes a first slide support leftward of the body frame and a second slide support rightward of the body frame.

The above characteristic configuration allows the support rods to be slid and guided on opposite lateral sides of the body frame. This allows the left and right support rods to support the front weight stably on both lateral sides.

The present invention may preferably further include:

a bracket connected to a front end portion of the at least one support rod and supporting the front weight in such a manner that the front weight is detachable from the bracket.

With the above characteristic configuration, the front weight is detachable from the bracket. This, for instance, allows the front weight to be detached under work circumstances that do not require a front weight, and also allows the front weight to be replaced with another front weight with a different weight depending on the work circumstances. The above configuration thereby improves the convenience.

The present invention may preferably be further arranged such that the drive actuator includes a hydraulic cylinder.

The above characteristic configuration includes a hydraulic cylinder, which produces a large force. This allows the heavy front weight to be moved accurately in the front-back direction.

[Solution 2]

The description below deals with a solution to Object 2.

The present invention characteristically includes:

a body frame;

a front weight supported by a front end portion of the body frame in such a manner as to be movable in a front-back direction;

a drive actuator configured to move the front weight in the front-back direction relative to the body frame between (i) a back position, at which the front weight is close to the body frame, and (ii) a front position, at which the front weight is far from the body frame;

a turning state determiner configured to determine whether a body of the work vehicle is performing turn travel; and a position controller configured to, in response to the turning state determiner determining that the body is performing turn travel, control an operation of the drive actuator so that the front weight is at the back position.

The above characteristic configuration allows the driver to operate the drive actuator for the front weight to be at the front position when the driver intends to cause the work vehicle to travel while performing work on the ground in an agricultural field. This eliminates the need to include a large-sized front weight, and allows the front weight to have a center of gravity at a position forward relative to the body. This in turn increases the traction of the body.

Further, when the work vehicle performs turn travel near a ridge, the turning state determiner determines that the body is performing turn travel. This allows the position controller to control the operation of the drive actuator so that the drive actuator automatically moves the front weight to the back position. This in turn reduces the amount by which the front weight protrudes forward, and thereby reduces the front-back dimension of the body. The above configuration also reduces the risk of the front weight coming into contact with a ridge, and thereby improves the work efficiency.

The above configuration therefore allows production of a work vehicle that is capable of increasing the traction of the body during work travel and that does not require a complicated operation for turn travel to prevent a decrease in the work efficiency.

The present invention may preferably further include:

a front wheel having a changeable direction; and a steering angle detecting sensor configured to detect a steering angle for the front wheel relative to a direction of the front wheel during straight travel, wherein in response to the steering angle detecting sensor detecting an angle not smaller than a predetermined angle as the steering angle, the turning state determiner determines that the body is performing turn travel.

The above characteristic configuration allows the turning state determiner to accurately determine, on the basis of a steering angle for the front wheel relative to its direction during straight travel, that the body is performing turn travel. This in turn reliably reduces, during turn travel, the amount by which the front weight protrudes forward.

The present invention may preferably further include:

a mode switching tool configured to switch a control mode of the position controller between an automatic mode and a manual mode; and a manual operation tool manually operable to operate the drive actuator, wherein the position controller is configured to:

while the control mode is set to the automatic mode, control the operation of the drive actuator based on a result of the determination by the turning state determiner, and while the control mode is set to the manual mode, control the operation of the drive actuator so that the front weight is at the front position or the back position in accordance with an operation on the manual operation tool, regardless of the result of the determination by the turning state determiner.

With the above characteristic configuration, setting the control mode to the automatic mode for work in an agricultural field allows the front weight to be automatically moved to the back position in response to the work vehicle approaching a ridge. This saves trouble.

For work travel involving turn travel, however, the front weight being at the back position during the turn will cause the body to have a center of gravity at a position backward. This will decrease the traction.

In view of the above issue, the above configuration allows the driver to set the control mode to the manual mode during work travel such as the above. This allows the driver to operate the manual operation tool to set the control mode at will. This in turn allows the work vehicle to perform work suitably.

Setting the control mode appropriately thus allows the front weight to be at a position suitable for the current work.

The present invention may preferably be further arranged such that the drive actuator includes a hydraulic cylinder.

The above characteristic configuration includes a hydraulic cylinder, which produces a large force. This allows the heavy front weight to be moved accurately in the front-back direction.

DESCRIPTION OF EMBODIMENTS

The description below deals with a tractor (which is an example of the "work vehicle") as an embodiment of the present invention with reference to drawings. In the description below, arrow F indicates the forward direction of the body (see FIGS. 1 and 2), arrow B indicates the backward direction of the body (see FIGS. 1 and 2), arrow L indicates the leftward direction of the body (see FIG. 2), and arrow R indicates the rightward direction of the body (see FIG. 2).

[Overall Configuration of Tractor]

Figure 1:
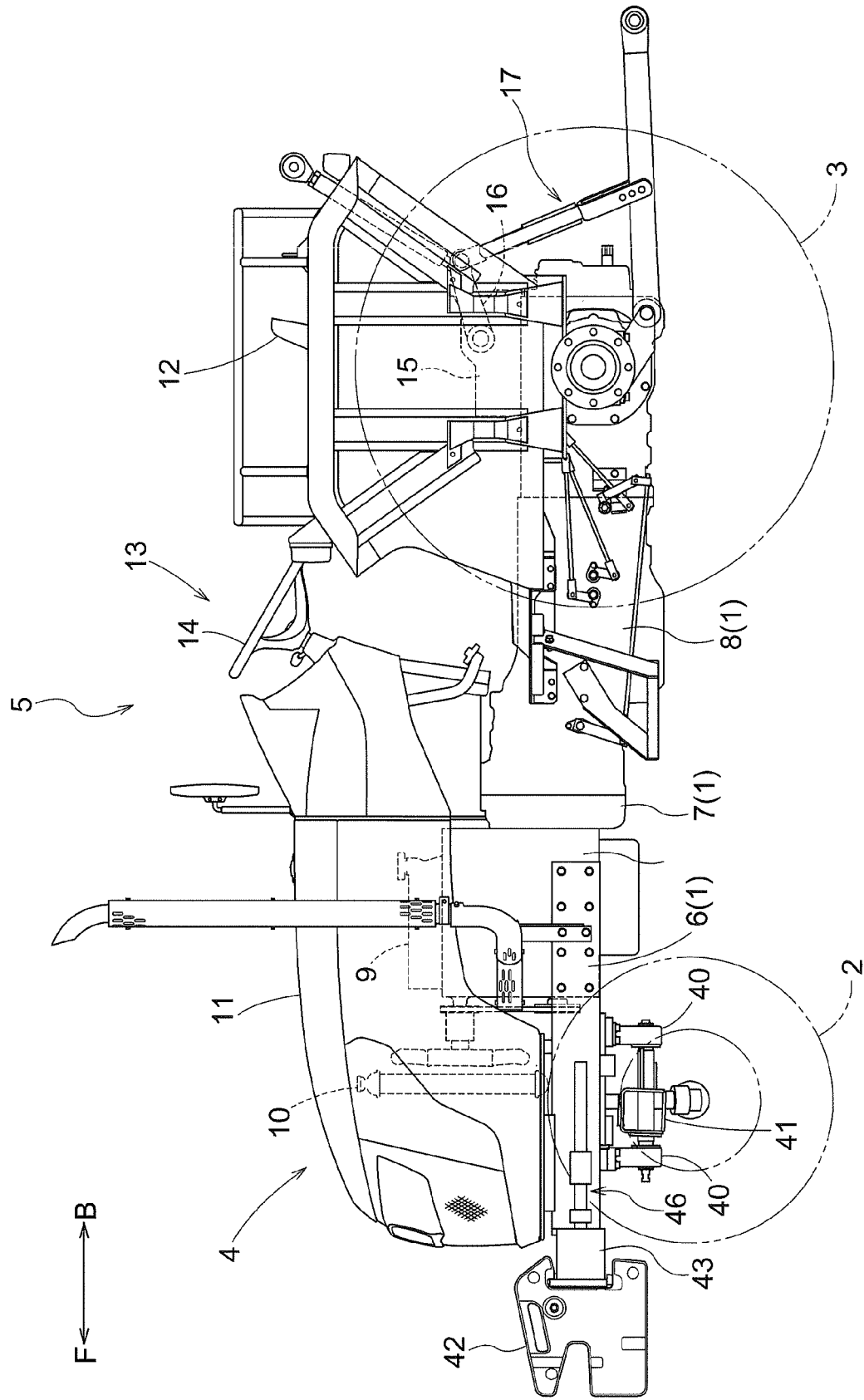
FIG. 1 is a side view of a tractor.
Figure 2:
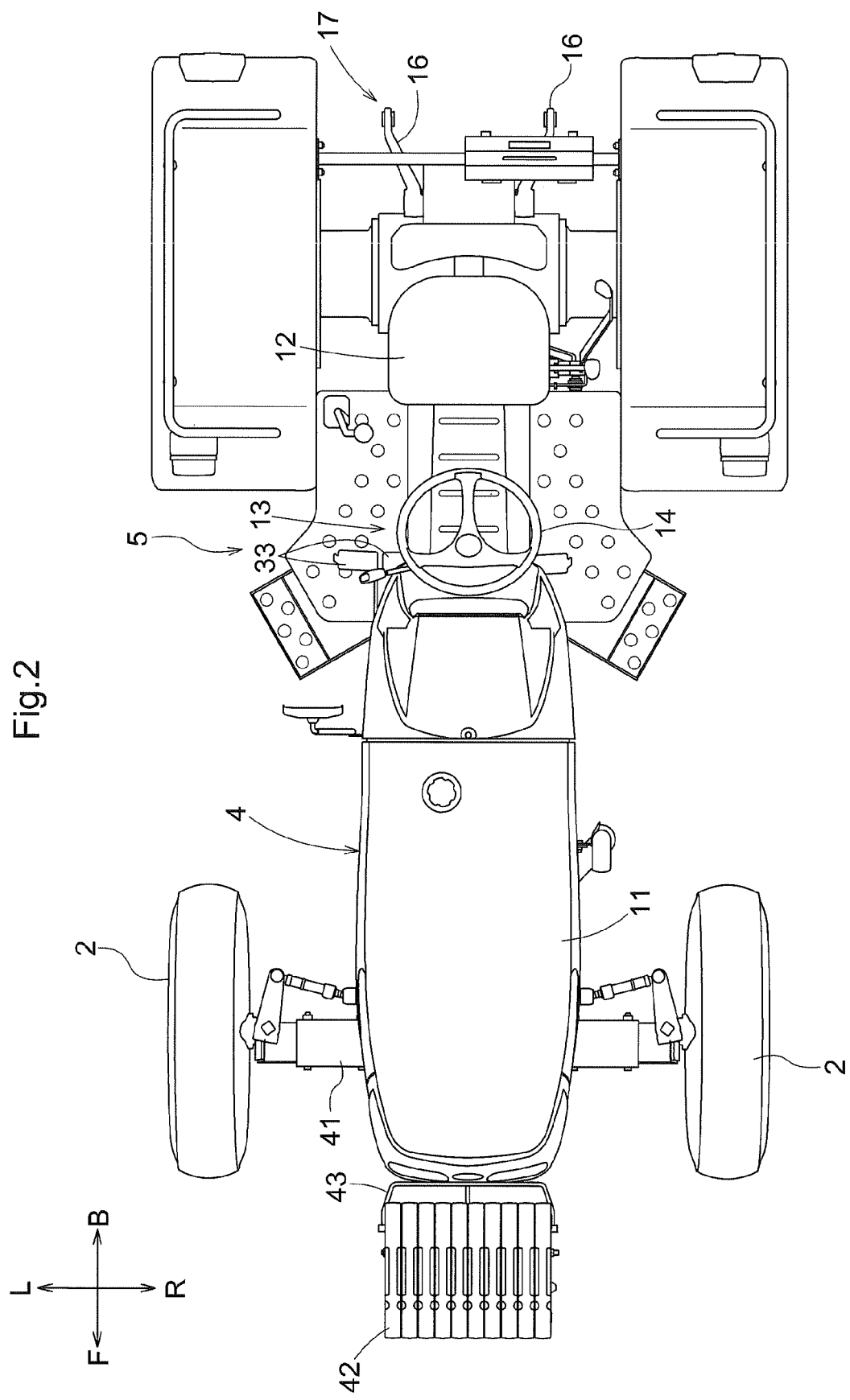
FIG. 2 is a plan view of a tractor.

As illustrated in FIGS. 1 and 2, the tractor includes a body frame 1 supporting the entire body, a pair of left and right front wheels 2 and a pair of left and right rear wheels 3 supporting the body frame 1, a motor section 4 at a front portion of the body, and a driver section 5 at an intermediate portion of the body with respect to its front-back direction. The body frame 1 includes front frames 6, a clutch housing 7, and a transmission case 8 arranged in this order from forward to backward and integrally connected to one another. The motor section 4 is supported by the front frames 6.

The motor section 4 contains an engine 9 as well as various devices related to the engine 9 such as a radiator 10 for cooling the engine 9. The motor section 4 is covered by a hood 11 capable of being opened and closed. The engine 9 transmits its power to the front wheels 2 and the rear wheels 3 through a travel power transmission system including a travel transmission device (not shown in the drawings) contained in the transmission case 8 included in the body frame 1. The driver section 5 includes a driver's seat 12 and a steering section 13 in front of the driver's seat 12. The steering section 13 includes operation tools such as a steering wheel 14.

The tractor includes a pair of left and right lift arms 16 and a power take-off shaft (not shown in the drawings) at a back portion of the transmission case 8. The lift arms 16 are drivable to swing in the up-down direction in response to an operation of a hydraulic lifting/lowering cylinder 15 contained in an upper back portion of the transmission case 8. The power take-off shaft is capable of taking off power of the engine 9 to the outside, and receives power from the engine 9 through a work power transmission system. The work power transmission system is separate from the travel power transmission system in the transmission case 8, and includes a work transmission device (not shown in the drawings) and a work clutch (not shown in the drawings). The lift arms 16 are connected to a link mechanism 17 disposed behind the transmission case 8 and swingable to be lifted and lowered. The power take-off shaft is connectable to, for example, a power transmission shaft for transmitting power to a work device (not shown in the drawings), such as a rotary tiller device, connected to the link mechanism 17.

[Steering Device]

Figure 3:
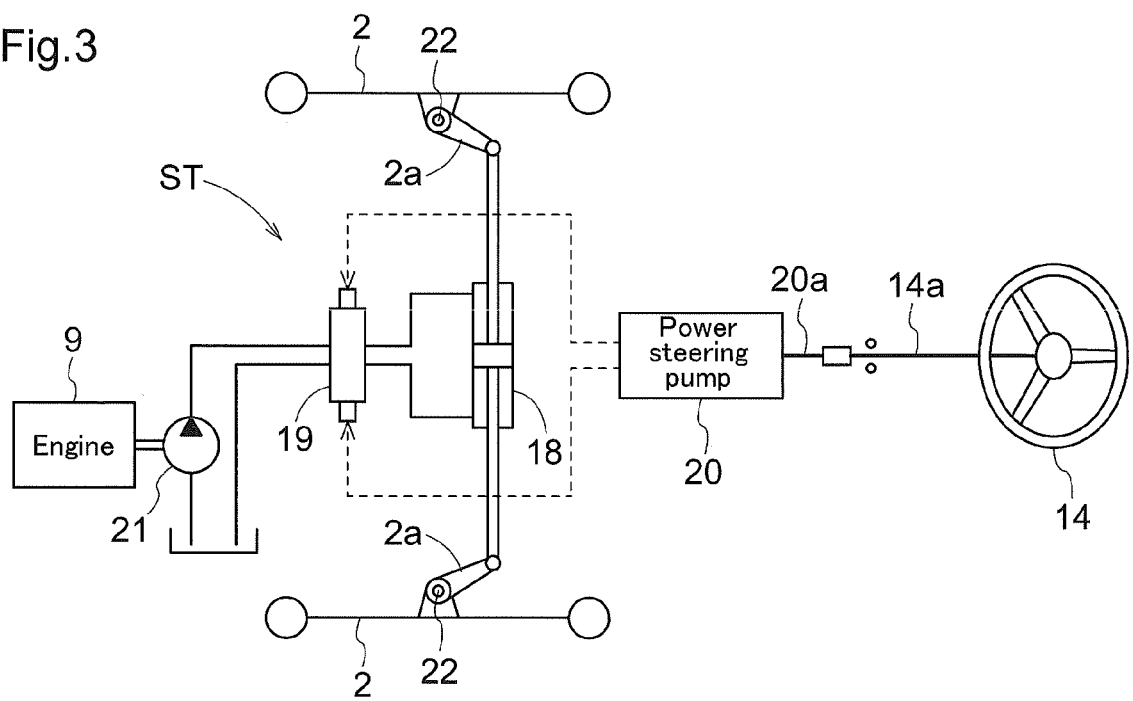
FIG. 3 is a diagram schematically illustrating how a steering device is configured.

The tractor includes a steering device ST that allows the steering wheel 14 to be turned to change the direction of the front wheels 2. As illustrated in FIG. 3, the steering device ST includes a hydraulic steering cylinder 18, an operation valve 19, and a power steering pump 20. The steering cylinder 18 is connected to and interlocked with respective knuckle arms 2a of the left and right front wheels 2. The steering cylinder 18 is also connected to a hydraulic pump 21 with the operation valve 19 in-between. The hydraulic pump 21 is connected to and interlocked with the engine 9. The power steering pump 20 is connected to the operation valve 19, and includes an input shaft 20a connected to and interlocked with the operation shaft 14a of the steering wheel 14.

With the above configuration, turning the steering wheel 14 rotates the input shaft 20a of the power steering pump 20. The rotation of the input shaft 20a in turn causes the operation valve 19 to operate in accordance with the amount of the rotation and supply pressure oil to the steering cylinder 18. The operation of the steering cylinder 18 causes (i) the front wheels 2 to turn in a direction corresponding to the direction in which the steering wheel 14 has been turned and (ii) the knuckle arms 2a to swing by a turning angle corresponding to the amount of the rotation of the input shaft 20a of the power steering pump 20. The knuckle arms 2a each swing on a pivot portion provided with a turning angle sensor 22 (steering angle detecting sensor) configured to detect a turning angle of the corresponding front wheel 2 which turning angle corresponds to a steering angle for the front wheel 2 relative to its direction during straight travel.

The tractor may be set in, as its travel mode, any of a four-wheel drive mode, a two-wheel drive mode, a small-turn mode, and a steep-turn mode, and is switchable between the four modes. In the four-wheel drive mode, the tractor drives the front wheels 2 and the rear wheels 3 at the equal circumferential speed. In the two-wheel drive mode, the tractor drives only the rear wheels 3. In the small-turn mode, the tractor drives the front wheels 2 and the rear wheels 3 at the equal circumferential speed during straight travel, but is switched into a front-wheel speedup state, that is, increases (approximately doubles) the circumferential speed of the front wheels 2 over that of the rear wheels 3, during turn travel. In the steep-turn mode, the tractor not only increases (approximately doubles) the circumferential speed of the front wheels 2 over that of the rear wheels 3 (front-wheel speedup state), but also brakes that one of the rear wheels 3 which is on the inner side of the turn during turn travel. The travel mode is switchable with use of a travel mode setter 23 (see FIG. 8) included in the steering section 13.

[Front-Wheel Speedup Device]

The description below deals with a front-wheel speedup device 24 for switching the tractor into the front-wheel speedup state.

Figure 4:
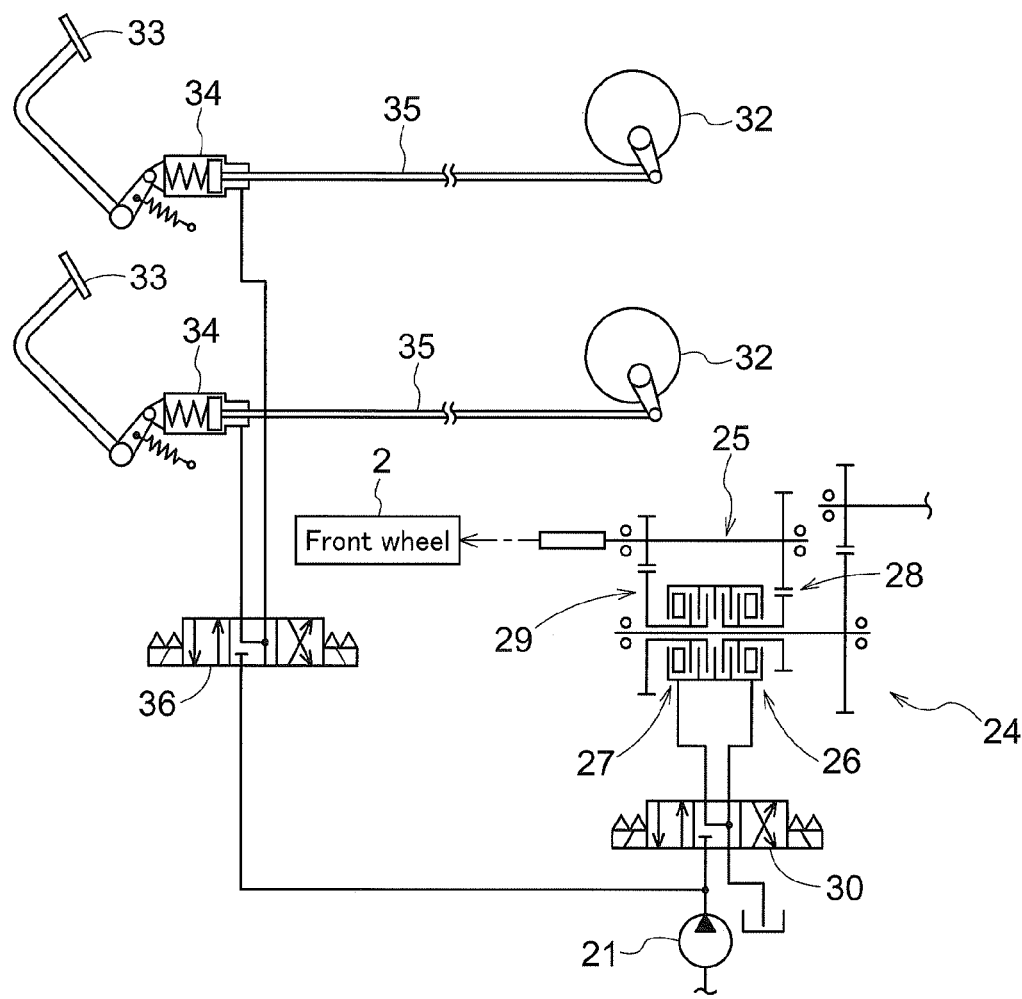
FIG. 4 is a structural diagram schematically illustrating how a power transmission switching device and side brakes function.

As illustrated in FIG. 4, the front-wheel speedup device 24 includes a power transmission switching device 25 in a power transmission system for the front wheels 2. The power transmission switching device 25 includes a first clutch 26 and a second clutch 27 for connecting and disconnecting power transmission to the front wheels 2. With the first clutch 26 in the power-transmitting state, the front-wheel speedup device 24 transmits power to the front wheels 2 through a first power transmission mechanism 28 to drive the front wheels 2 to rotate at a circumferential speed substantially equal to that of the rear wheels 3. With the second clutch 27 in the power-transmitting state, the front-wheel speedup device 24 transmits power to the front wheels 2 through a second power transmission mechanism 29 to drive the front wheels 2 to rotate at a circumferential speed substantially twice as high as that of the rear wheels 3.

The first and second clutches 26 and 27 each receive operating oil from the hydraulic pump 21. The tractor includes a front-wheel speedup switching valve 30 in the form of a three-position solenoid valve to switch how the operating oil is supplied. As described later, how the front-wheel speedup switching valve 30 is operated is controlled by a control device 31. The control device 31 includes a microcomputer, and is capable of controlling the respective operations of two or more devices in accordance with a predetermined control program.

[Side Brakes]

The tractor includes left and right side brakes 32 disposed on opposite lateral sides of the transmission case 8 and configured to independently brake the respective rear wheels 3. The tractor also includes a pair of left and right brake pedals 33 at a bottom portion of the driver section 5, a pair of left and right brake cylinders 34, and a pair of left and right interlocking rods 35. As illustrated in FIG. 4, the side brakes 32 are each interlocked with the corresponding brake pedal 33 with the corresponding brake cylinder 34 and interlocking rod 35 in-between. With this configuration, pressing either of the brake pedals 33 brakes the corresponding rear wheel 3 with a braking force corresponding to the amount of the press.

The brake cylinders 34 are each in the form of a single-acting hydraulic cylinder. The brake cylinders 34 each receive operating oil from the hydraulic pump 21. The tractor includes a brake switching valve 36 in the form of a three-position solenoid valve to switch how the operating oil is supplied. Operating the brake switching valve 36 allows the respective pistons of the brake cylinders 34 to actuate separately, thereby activating the side brakes 32 separately. This means that operating the brake switching valve 36 allows either of the side brakes 32 to be activated even without pressing the correspond brake pedal 33.

Figure 8:
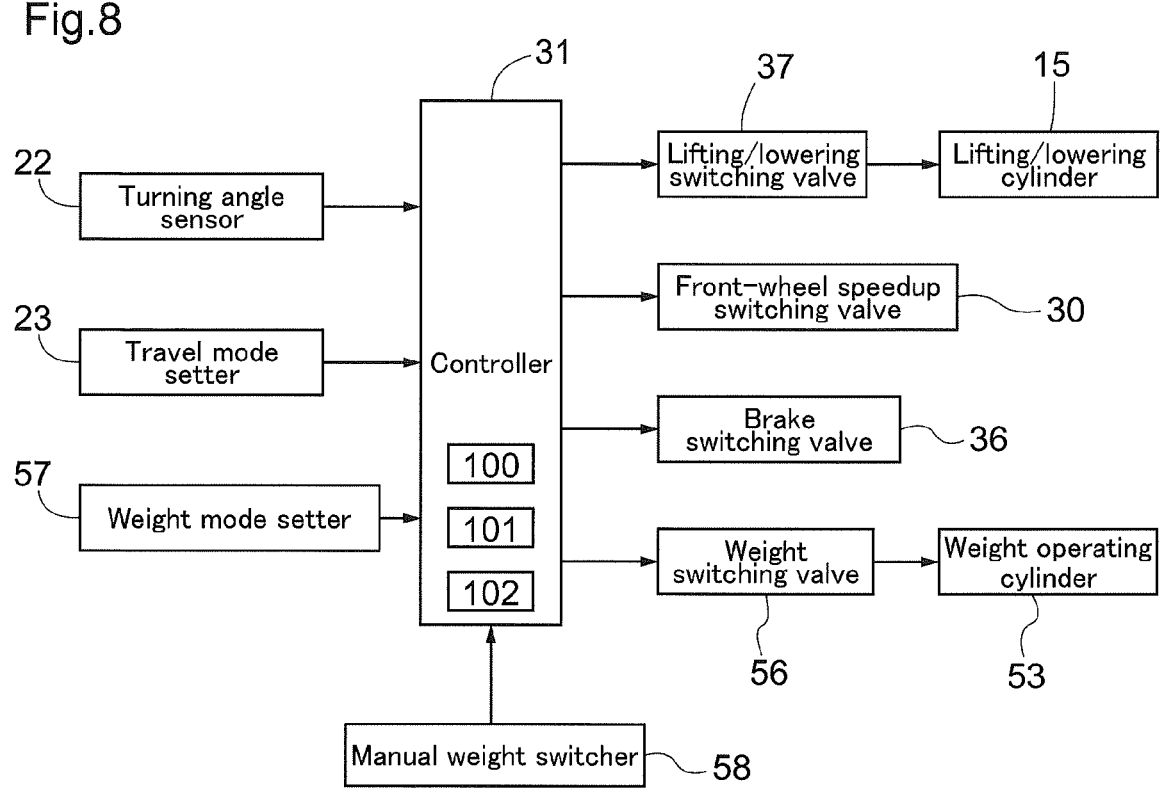
FIG. 8 is a control block diagram.

As illustrated in FIG. 8, the control device 31 includes a turn controller 100 in the form of a control program. The turn controller 100 is configured to control the respective operations of the front-wheel speedup switching valve 30 and the brake switching valve 36 in accordance with the travel mode set by the travel mode setter 23 and on the basis of information such as a result of the detection by the turning angle sensor 22.

In the four-wheel drive mode, the turn controller 100 switches the front-wheel speedup switching valve 30 into the front-wheel speedup state, and drives the front wheels 2 and the rear wheels 3 at the equal speed. In the two-wheel drive mode, the turn controller 100 disables transmission of power to the front wheels 2 and drives only the rear wheels 3. In the small-turn mode or steep-turn mode, the turn controller 100 drives the front wheels 2 and the rear wheels 3 in accordance with the mode during turn travel.

The tractor is, for instance, in the four-wheel drive mode to travel in an agricultural field, in the two-wheel drive mode to, for example, travel on the road, in the small-turn mode to make a small turn in an agricultural field, or in the steep-turn mode to, for example, make a turn after approaching a ridge as closely as possible.

The description below deals with how the turn controller 100 controls the respective operations of other components.

Figure 9:
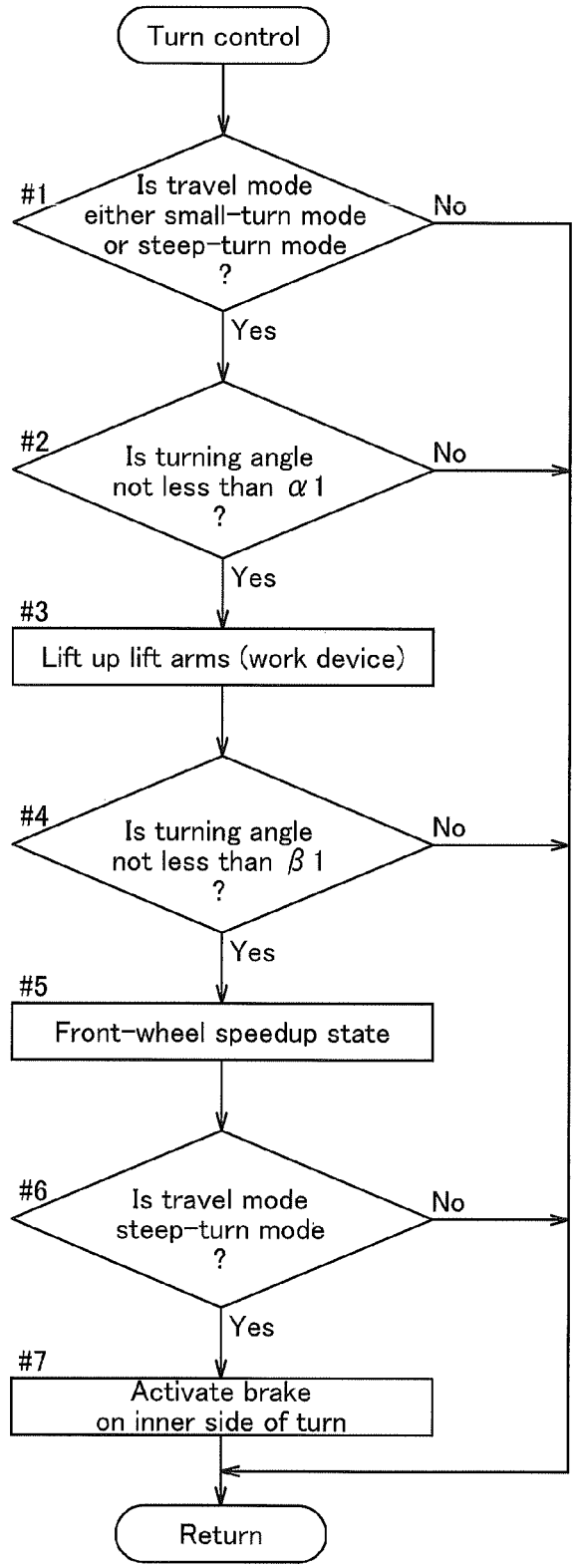
FIG. 9 is a flowchart for turn control.
Figure 11:
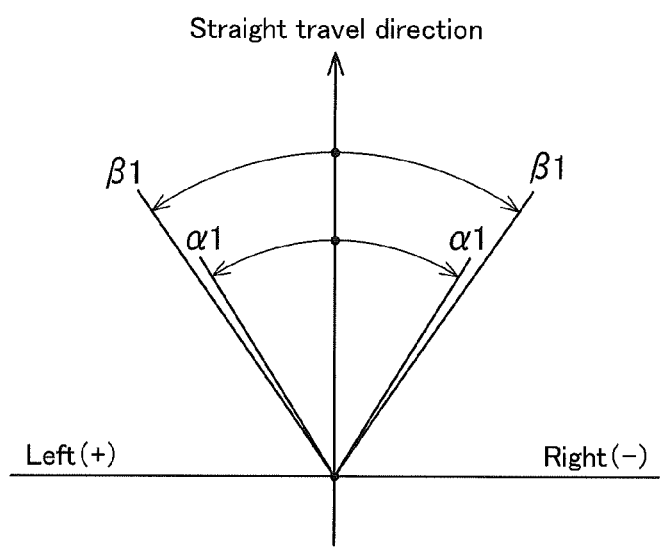
FIG. 11 is a diagram illustrating turning angles for determination of a turning state.

As illustrated in FIG. 9, the turn controller 100 determines whether the travel mode is a small-turn mode or steep-turn mode (step #1). If the turn controller 100 has determined that the travel mode is a small-turn mode or steep-turn mode, the turn controller 100 determines on the basis of the result of determination by the turning angle sensor 22 whether the front wheels 2 have a turning angle not smaller than a first predetermined angle α1 (see FIG. 11) (step #2). If the turn controller 100 has determined that the turning angle is not smaller than the first predetermined angle α1, the turn controller 100 controls how the lifting/lowering switching valve 37 operates on the hydraulic lifting/lowering cylinder 15 to lift the lift arms 16 (step #3). This greatly lifts a work device (not shown in the drawings) connected to a back portion of the body. The turn controller 100 then determines whether the turning angle is not smaller than a second predetermined angle 131 larger than the first predetermined angle α1 (step #4). If the turn controller 100 has determined that the turning angle is not smaller than the second predetermined angle (31, the turn controller 100 operates the front-wheel speedup switching valve 30 to set the second clutch 27 of the front-wheel speedup device 24 into the power-transmitting state and thereby switch the front-wheel speedup switching valve 30 into the front-wheel speedup state (step #5). The turn controller 100 then determines whether the travel mode is a steep-turn mode (step #6). If the turn controller 100 has determined that the travel mode is a steep-turn mode, the turn controller 100 operates the brake switching valve 36 to activate the side brake 32 for the rear wheel 3 on the inner side of the turn (step #7).

[Body Frame]

Figure 5:
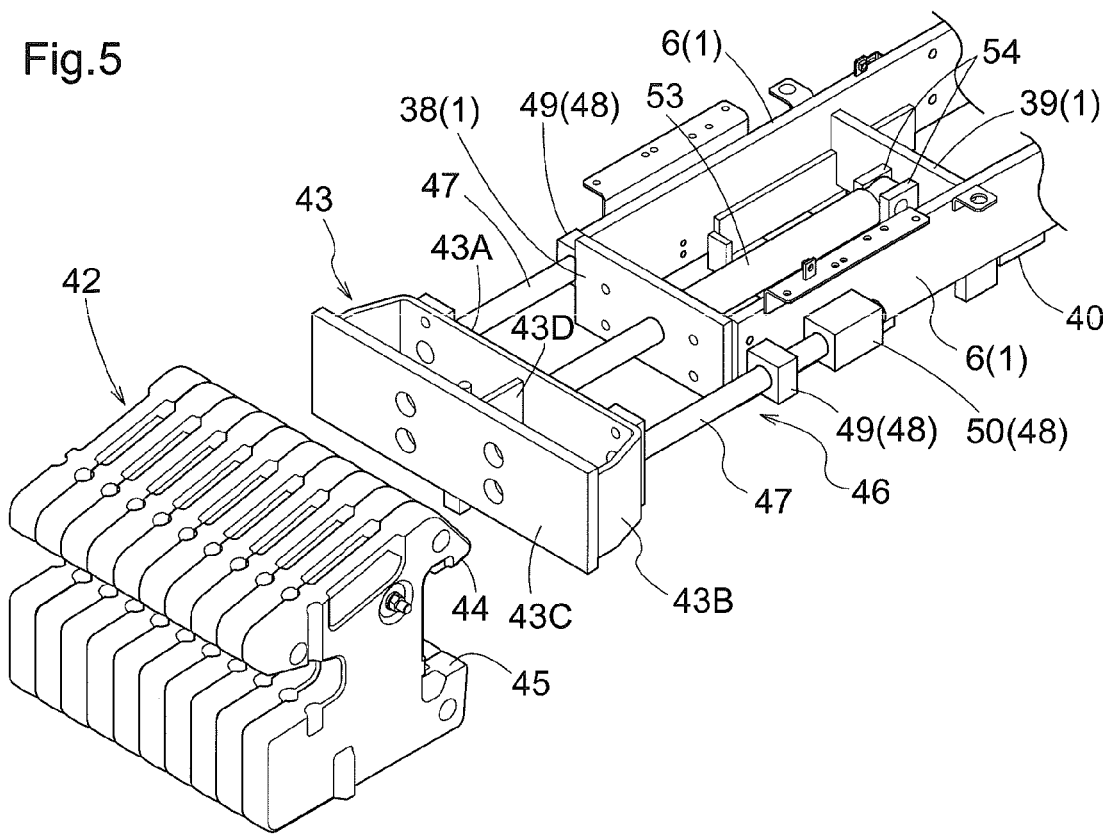
FIG. 5 is a perspective view of a front weight, illustrating how the front weight is supported.

As illustrated in FIG. 5, the body frame 1 includes a pair of left and right front frames 6 disposed at a front portion of the body, extending in the front-back direction of the body, and apart from each other in the width direction of the body. The front frames 6 are each in the form of a vertically oriented band plate having a small dimension in the width direction of the body and a predetermined dimension in the up-down direction. The front frames 6 have respective front ends connected to each other by a plate-shaped first connection frame 38. The first connection frame 38 is in the form of a vertically oriented band plate extending in the width direction of the body from one front frame 6 to the other and having a small dimension in the front-back direction and a dimension in the up-down direction which dimension is substantially equal to that of each front frame 6.

The front frames 6 are connected to each other also at an intermediate position with respect to the front-back direction by a plate-shaped second connection frame 39. The second connection frame 39 is in the form of a band plate extending in the width direction of the body from one front frame 6 to the other and having a small dimension in the front-back direction and a dimension in the up-down direction which dimension is smaller than that of each front frame 6.

The front frames 6 have respective lower ends connected to each other by a pair of bottom plate frames 40 each at an intermediate position with respect to the front-back direction. The bottom plate frames 40 are apart from each other in the front-back direction, and are each oriented horizontally to have a predetermined dimension in the front-back direction. The bottom plate frames 40 are supported by a cylindrical front axle case 41 disposed under the front frames 6 and connecting the front wheels 2 to each other. As described above, the body frame 1 includes a plurality of frame parts connected to one another for increased rigidity.

[Front Weight]

As illustrated in FIGS. 1, 2, and 5, the tractor includes a front weight 42 at the front end of the body frame 1. The tractor also includes a weight support 43 in the form of a bracket disposed at the respective front ends of the front frames 6 of the body frame 1 and supporting the front weight 42. The weight support 43 is disposed forward of the hood 11, and extends in the up-down direction and in the width direction of the body.

The weight support 43 is in the shape of a frame in a plan view, and is made up of plate-shaped members. The weight support 43 includes a back portion 43A, left and right lateral portions 43B, a front portion 43C, and an intermediate reinforcement 43D. The back portion 43A and the lateral portions 43B are integrally in the form of a bent band plate. The front portion 43C is in the form of a band plate connecting the respective front ends of the lateral portions 43B to each other. The front portion 43C and the back portion 43A each have faces parallel to the front face of the first connection frame 38 and a dimension in the width direction of the body which dimension is substantially equal to that of the first connection frame 38. The intermediate reinforcement 43D extends from the front portion 43C to the back portion 43A at respective intermediate positions with respect to the lateral direction.

The front weight 42 includes an upper engagement section 44 and a lower engagement section 45. Engaging the engagement section 44 with the upper end of the front portion 43C of the weight support 43 allows the front weight 42 to be pressed against the front face of the front portion 43C due to its self weight. This in turn causes the engagement section 45 to be engaged with the lower end of the front portion 43C from below. This configuration allows the front weight 42 to be supported in such a manner that the front weight 42 will not become disengaged by an upward force caused by, for example, a shake of the body.

The tractor includes a support mechanism 46 and a hydraulic weight operating cylinder 53. The support mechanism 46 supports the front weight 42 in such a manner that the front weight 42 is movable in the front-back direction relative to the body frame 1. The weight operating cylinder 53 (which is an example of the "drive actuator") is capable of moving the front weight 42 in the front-back direction relative to the body frame 1 between (i) a back position, at which the front weight 42 is close to the body frame 1, and (ii) a front position, at which the front weight 42 is far from the body frame 1.

Figure 6:
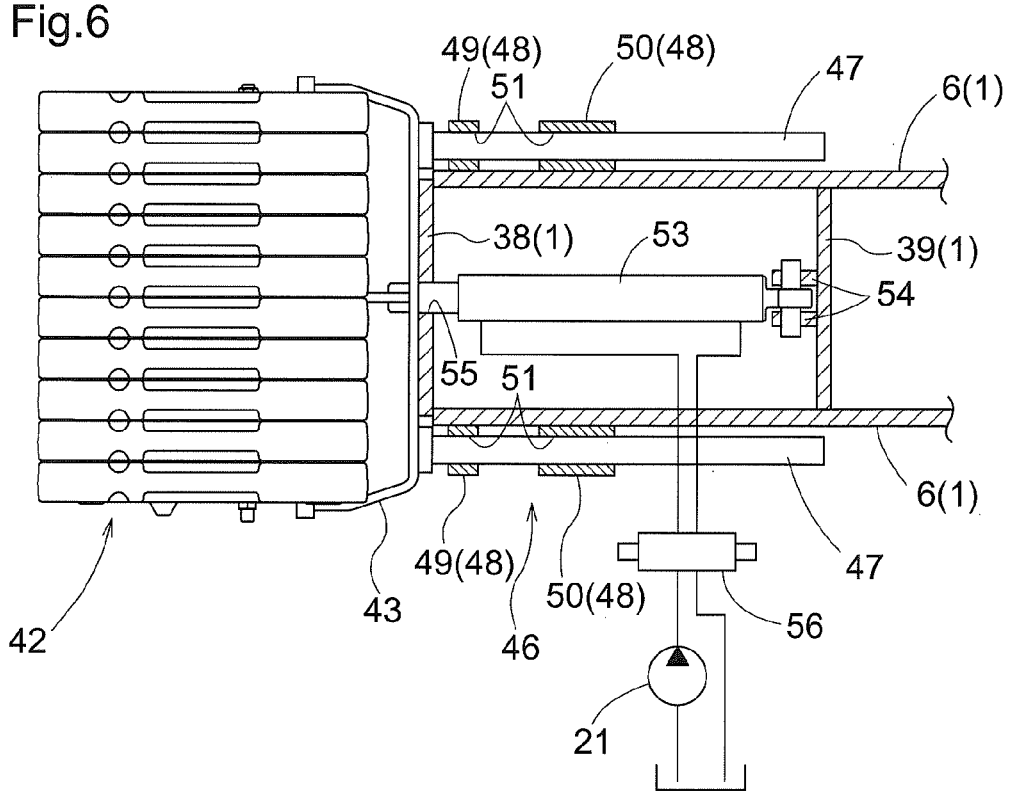
FIG. 6 is a plan cross-sectional view of a front weight at a back position, illustrating how the front weight is supported.

As illustrated in FIGS. 5 and 6, the support mechanism 46 includes two support rods 47 and two slide supports 48. The support rods 47 extend in the front-back direction, and are movable in the front-back direction integrally with the front weight 42 while supporting the front weight 42. The slide supports 48 are disposed on the body frame 1, and support the respective support rods 47 in such a manner that the support rods 47 are slidable in the front-back direction.

The slide supports 48 are each attached fixedly and integrally to the laterally outer side face of the corresponding front frame 6. The slide supports 48 each include a front support portion 49 and a back support section 50. The front support section 49 and the back support section 50 are apart from each other in the front-back direction. The front support section 49 and the back support section 50 each have an insertion hole 51 through which the corresponding support rod 47 is disposed in such a manner as to be slidable in the front-back direction.

The support rods 47 each include a front end portion integrally connected to the back portion 43A of the weight support 43. The weight operating cylinder 53 extends in the front-back direction between the first connection frame 38 and the second connection frame 39.

The weight operating cylinder 53 includes a cylinder tube 53A. The cylinder tube 53A includes a back end portion connected pivotally to a support bracket 54, which is fixed to the second connection frame 39, in such a manner that the weight operating cylinder 53 is swingable about a lateral axis. The weight operating cylinder 53 also includes a cylinder rod 53B. The cylinder rod 53B extends forward of the body through an insertion hole 55 in the first connection frame 38. The cylinder rod 53B includes a front end portion connected to and interlocked with the back portion 43A of the weight support 43 in such a manner as to be movable in the front-back direction integrally with the weight support 43.

Figure 7:
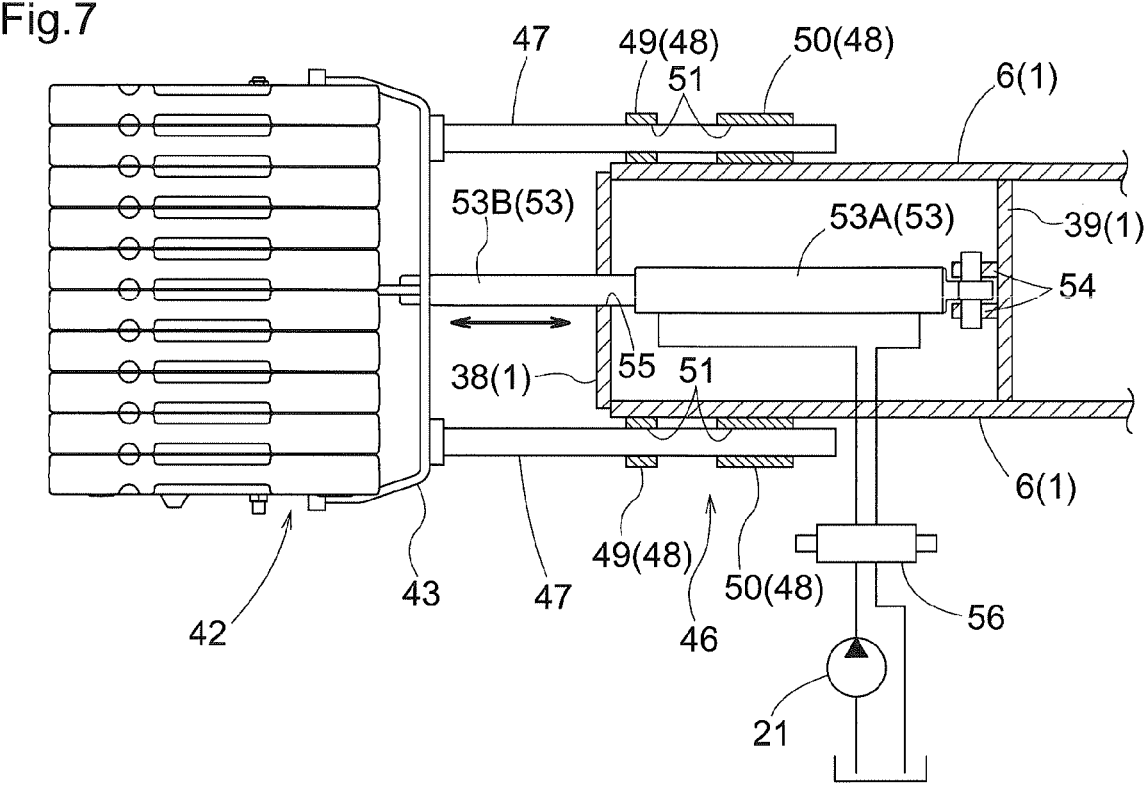
FIG. 7 is a plan cross-sectional view of a front weight at a front position, illustrating how the front weight is supported.

As illustrated in FIGS. 6 and 7, the weight operating cylinder 53 receives operating oil from the hydraulic pump 21. The tractor includes a weight switching valve 56 in the form of a three-position solenoid valve to switch how the operating oil is supplied. As illustrated in FIG. 8, how the weight switching valve 56 is operated is controlled by the control device 31.

Extending and contracting the weight operating cylinder 53 moves the front weight 42 in the front-back direction relative to the body frame 1 between (i) the back position, at which the front weight 42 is close to the body frame 1 (see FIG. 6), and (ii) the front position, at which the front weight 42 is far from the body frame 1 (see FIG. 7). The front weight 42 is slidable in the front-back direction by means of the support rods 47 while being supported by the support rods 47.

[Change of Weight Position]

The control device 31 includes a turning state determiner 101 and a position controller 102 each in the form of a control program. The turn state determiner 101 is configured to determine whether the body is in a turning state, that is, whether the body is performing turn travel. The position controller 102 is configured to, in response to the turning state determiner 101 determining that the body is in the turning state, control the operation of the weight operating cylinder 53 so that the front weight 42 is at the back position.

As illustrated in FIG. 8, the tractor includes a weight mode setter 57 and a manual weight switcher 58. The weight mode setter 57 is in the form of a mode switching tool configured to switch the control mode of the position controller 102 between an automatic mode and a manual mode. The manual weight switcher 58 is in the form of a manual operation tool manually operable to operate the weight operating cylinder 53.

The description below deals with how the position controller 102 controls the operation of the weight operating cylinder 53.

Figure 10:
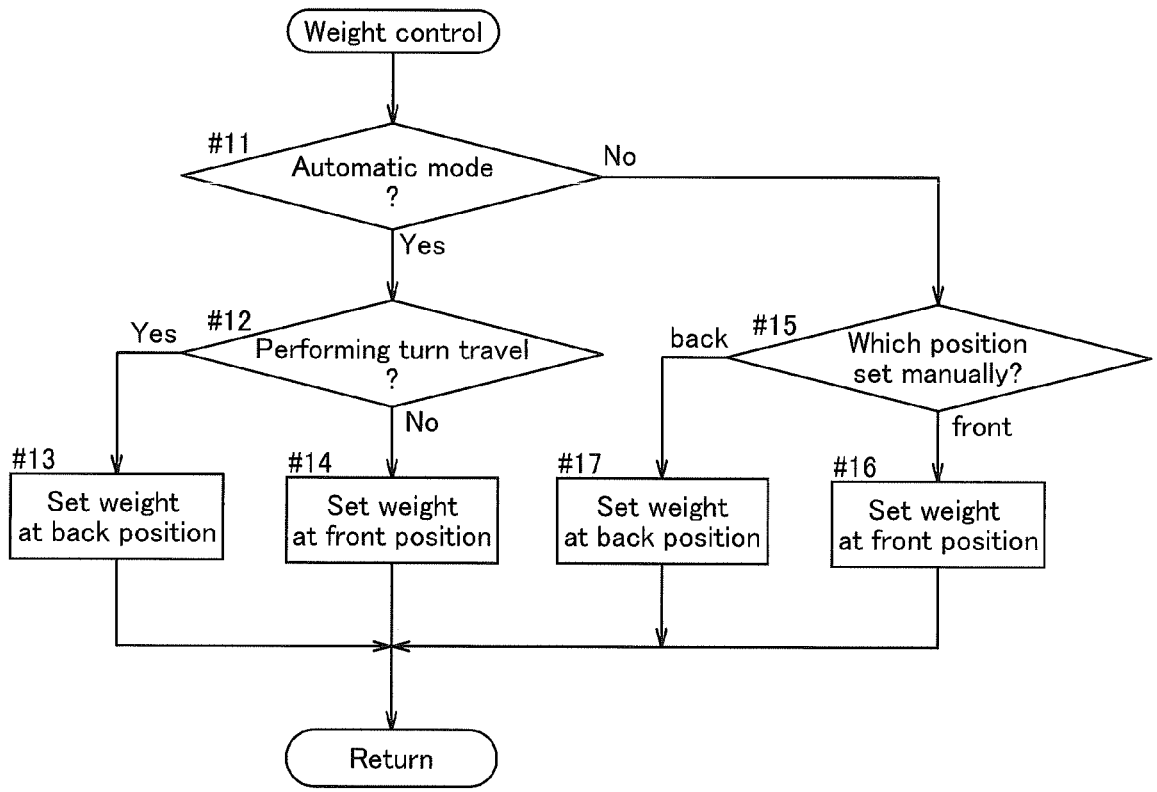
FIG. 10 is a flowchart for control of weight position change.

As illustrated in FIG. 10, the position controller 102 determines whether its control mode is set to the automatic mode (step #11). If the position controller 102 has determined that its control mode is set to the automatic mode, the position controller 102 determines whether the body is in the turning state, that is, whether the body is performing turn travel, on the basis of determination, based on the result of determination by the turning angle sensor 22, of whether the front wheels 2 have a turning angle not smaller than the first predetermined angle α1 (step #12). If the position controller 102 has determined that the body is in the turning state, the position controller 102 controls the operation of the weight operating cylinder 53 so that the front weight 42 is at the back position (step #13). If the position controller 102 has determined that the body is not in the turning state, the position controller 102 controls the operation of the weight operating cylinder 53 so that the front weight 42 is at the front position (step #14).

If the position controller 102 has determined that its control mode is set to the manual mode, the position controller 102 controls the operation of the weight operating cylinder 53 so that the front weight 42 is at the front or back position in accordance with the operation of the manual weight switcher 58, regardless of whether the body is in the turning state (steps #15, #16, and #17).

With the above configuration, while the tractor is performing straight work travel in an agricultural field, the front weight 42 is at the front position, so that the front weight 42 has a center of gravity at a position forward relative to the body. The front weight 42 thereby applies an increased load on a forward portion of the body, increasing the traction of the body.

The above configuration also allows the front weight 42 to be automatically moved to the back position when the tractor is making a steep turn near a ridge (headland) into a subsequent work path. This allows the tractor to make a turn at a position as close to the ridge or the like as possible with a reduced risk of coming into contact with the ridge. The above configuration also allows the tractor to keep the front weight 42 at the back position while the tractor is in a non-working state, for example, while the tractor is traveling on the road, for the body to have a reduced front-back dimension.

ALTERNATIVE EMBODIMENTS (1) The embodiment described above is arranged such that the support mechanism 46 includes (i) a support rod 47 and a slide support 48 on the left side of the body frame 1 and (ii) another support rod 47 and another slide support 48 on the right side of the body frame 1. This arrangement may be modified variously in terms of the mechanism such that the tractor includes (i) only one pair of a support rod 47 and a slide support 48 at a central portion with respect to the left-right direction, (ii) a parallel link mechanism that allows the front weight 42 to be moved, or (iii) a swing arm that allows the front weight 42 to be moved between the front position and the back position.

(2) The embodiment described above is arranged such that each support rod 47 includes a front end portion connected to a weight support 43 (bracket) by which the front weight 42 is supported detachably. This arrangement may be modified such that the front weight 42 is undetachably attached to the weight supports 43 or the support rods 47.

(3) The embodiment described above is arranged such that the drive actuator is in the form of a hydraulic weight operating cylinder 53. The drive actuator is, however, not necessarily a hydraulic cylinder, and may be an electric cylinder or any other drive device such as a rack-and-pinion slide operation mechanism.

(4) The embodiment described above is an example tractor including front wheels 2 and rear wheels 3 as travel devices. The present invention is, however, applicable similarly to a tractor including a different travel device such as a crawler travel device (not shown in the drawings) in place of the rear wheels 3.

(5) The present invention is applicable to a work vehicle including a front weight at a front portion of the body. The embodiment described above is a tractor as an example of the work vehicle. The present invention is, however, applicable similarly to other work vehicles such as riding-type rice transplanters and multipurpose paddy field work vehicles.

The invention claimed is:

1. A work vehicle, comprising:
a body frame;
a front weight supported by a front end portion of the body frame in such a manner as to be movable in a front-back direction;
a drive actuator configured to move the front weight in the front-back direction relative to the body frame between (i) a back position, at which the front weight is close to the body frame, and (ii) a front position, at which the front weight is far from the body frame;
a turning state determiner configured to determine whether a body of the work vehicle is performing turn travel; and
a position controller configured to, in response to the turning state determiner determining that the body is performing turn travel, control an operation of the drive actuator so that the front weight is at the back position.

2. The work vehicle according to claim 1, further comprising:
a front wheel having a changeable direction; and
a steering angle detecting sensor configured to detect a steering angle for the front wheel relative to a direction of the front wheel during straight travel,
wherein in response to the steering angle detecting sensor detecting an angle not smaller than a predetermined angle as the steering angle, the turning state determiner determines that the body is performing turn travel.

3. The work vehicle according to claim 1, further comprising:
a mode switching tool configured to switch a control mode of the position controller between an automatic mode and a manual mode; and
a manual operation tool manually operable to operate the drive actuator,
wherein the position controller is configured to:
while the control mode is set to the automatic mode, control the operation of the drive actuator based on a result of the determination by the turning state determiner, and
while the control mode is set to the manual mode, control the operation of the drive actuator so that the front weight is at the front position or the back position in accordance with an operation on the manual operation tool, regardless of the result of the determination by the turning state determiner.

4. The work vehicle according to claim 1, wherein the drive actuator includes a hydraulic cylinder.

* * * * *